Jan. 4, 1966   T. W. LAMB ETAL   3,227,997
WELL LOGGING
Filed Nov. 7, 1960   2 Sheets-Sheet 1 a INPUT   b OUTPUT

THE INVENTON a INPUT   b OUTPUT

INVENTORS:
T.W. LAMB
C.B. VOGEL
BY: *Theodore E. Bieber*
THEIR ATTORNEY

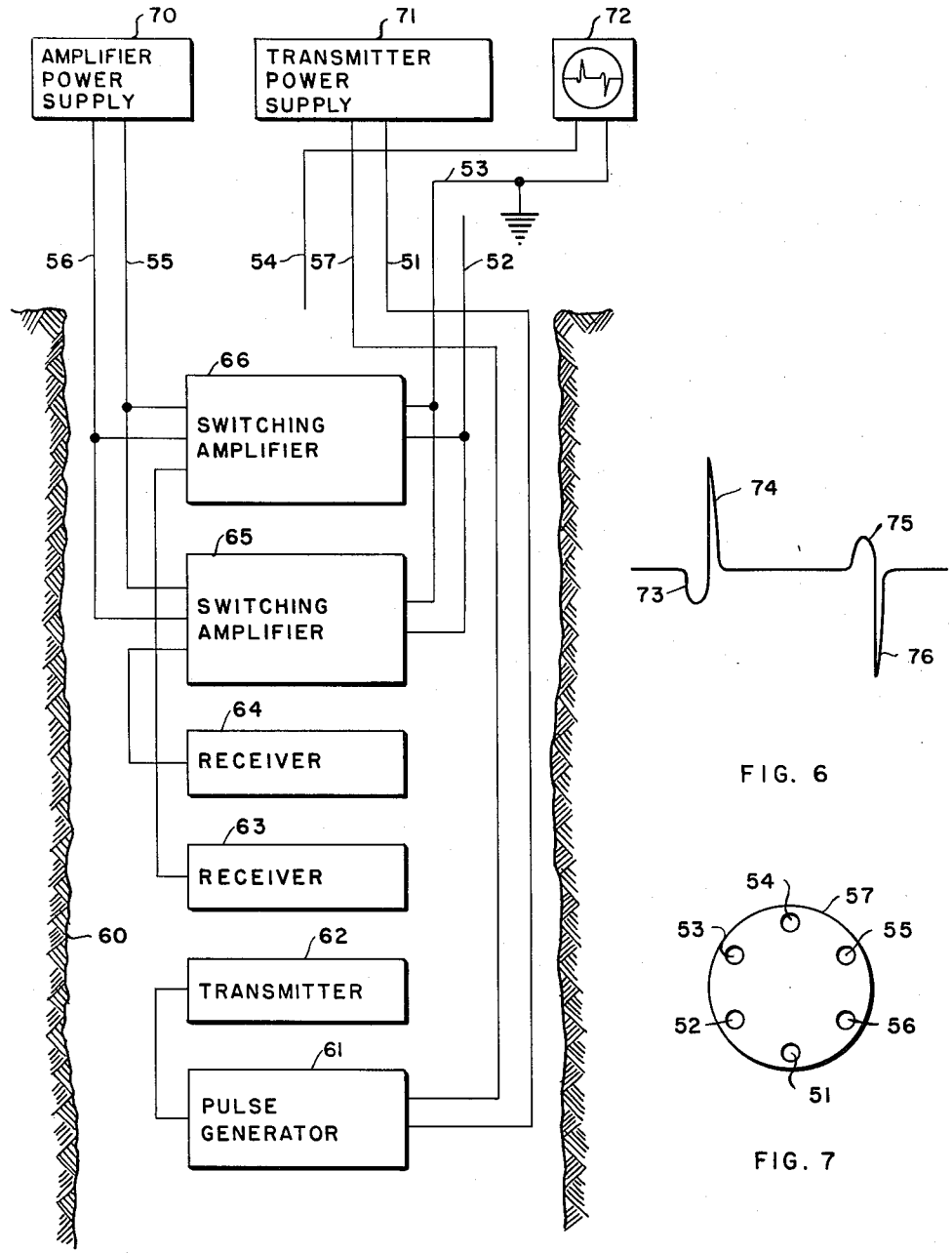

United States Patent Office 3,227,997
Patented Jan. 4, 1966

3,227,997
WELL LOGGING
Thomas W. Lamb and Charles B. Vogel, Houston, Tex., assignors to Shell Oil Company, New York, N.Y., a corporation of Delaware
Filed Nov. 7, 1960, Ser. No. 67,605
2 Claims. (Cl. 340—18)

This invention relates to the logging of earth formations traversed by a borehole and more particularly to logging methods in which it is desired to transmit high frequency electrical pulses of short duration over a multi-conductor cable from a logging device disposed in a borehole to a recording unit at the surface.

At the present time there are several types of logging devices which generate closely spaced or high frequencny electrical pulses of short duration which must be transmitted over a well logging cable to the surface. For example, in radioactive logging the detection of radioactive particles results in the generation of closely spaced electrical pulses of short duration. The problem of closely spaced electrical pulses also arises in acoustical logging instruments where two or more closely spaced receivers are used. In the past, when these narrow pulses have been transmitted to the surface over multi-conductor cables they have been seriously distorted and their width increased. In those cases where the pulses were spaced less than 100 microseconds apart they substantially overlapped and made it impossible to distinguish the time of the individual pulses. In the case of radioactive logging where one endeavors to count the occurrences of pulses by the use of digital counters or the like, inaccurate results were obtained since individual pulses failed to separately trigger the counter.

In order to avoid these difficulties the prior art has developed various telemetering systems in order to transmit the desired information by some means which does not require the transmission of closely spaced narrow electrical pulses. For example, in the case of radioactive logging a scaling circuit has been incorporated in the downhole tool in order to transmit to the surface only one pulse for a given number of pulses actually generated by the downhole tool. In the case of acoustical logging instruments electrical circuits have been used in the downhole tool which convert the time interval between the narrow pulses to a proportional direct current voltage which is then transmitted to the surface. While both of these prior art methods provide results they require complicated circuitry in the downhole tool and thus decrease the reliability of the instrument and the information received.

Accordingly, it is the principal object of this invention to provide a new and improved system for transmitting closely spaced narrow pulses over a multi-conductor logging cable.

A further object of this invention is to provide a system for transmitting closely spaced narrow electrical pulses over a multi-conductor cable by using selected conductors within the cable without substantially distorting or increasing the width of the pulses.

A still further object of the present invention is to provide an apparatus which is especially useful for transmitting high frequency pulses over long distances utilizing selected conductors in a multi-conductor cable.

The above objects and advantages of this invention are obtained by selecting particular conductors of a multi-conductor cable for transmitting the closely spaced narrow electrical pulses. More particularly, the pulse is supplied or fed to a pair of conductors at the sending end of the cable and removed at the receiving end from a pair of conductors. Three conductors are used to form the two pairs of conductors with the first and second conductors forming the pair at the sending end of the cable and the second and third conductors forming the pair at the receiving end. Thus the second conductor is common to both pairs while the first and third conductors are not. The transmission of the signal may be further improved by shorting the third conductor to one conductor of the pair to which the signal is applied at the sending end and then shorting the third conductor to the other member of that pair at the receiving end. In this case the signal is applied between a pair of conductors having one member shorted to a third conductor at the sending end and removed from a pair of conductors having a different member shorted to the same third conductor at the receiving end.

The reasons for the improvement in the transmission of the signal resulting when conductors are selected in accordance with this invention is unknown since the improvement was discovered by experiment. It is thought that the coupling due to the resistance, capacitance, and inductance between the fed and unfed conductor pairs in the cable is substantially a direct function of frequency while the attenuation of a signal is also a direct function of frequency. Thus, the cable may be equalized for amplitude and phase characteristics to a substantial degree when a signal is fed to such a first pair of conductors and removed from such a second pair of conductors. This equalization results in substantial reduction of distortion in this transmission of the electrical pulses. While a pulse is being transmitted over the first pair of conductors which is fed at the sending end, the pulse is being distorted in a given manner. During this transmission the distorted pulse is being further distorted due to its coupling with the second pair of conductors. Since this further distortion tends to change the shape of the pulse in a compensating manner, when the pulse is received at the receiving end on the second pair of conductors it has been restored to substantially its original shape. The attenuating and cross-coupling effects of the cable tend to be compensated in such a way as to make the cable transmit all frequencies with equal effectiveness.

The actual structure of this invention and its use in a logging system will be more easily understood from the following detailed description of preferred embodiments when taken in conjunction with the attached drawing, in which:

FIGURE 5 illustrates an acoustical logging system utilizing this invention for transmitting pulses from the downhole tool to the surface;

FIGURE 6 illustrates the pulses which are transmitted from the acoustical logging system of FIGURE 5; and FIGURE 7 illustrates a cross-section of the cable used in FIGURE 5.

Figure 1:
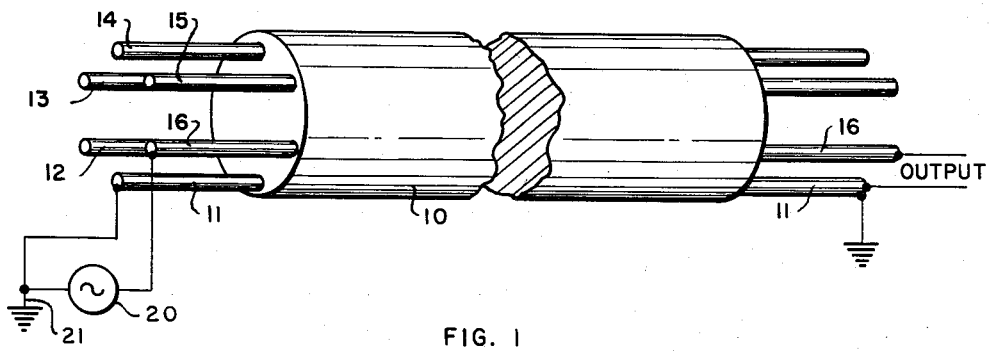
FIGURE 1 illustrates the normal means used for transmitting an electrical signal over to conductors of a multi-conductor cable.

Referring now to FIGURE 1, there is shown a multi-conductor cable 10 which is provided with six conductors 11–16 disposed in a hexagonal spacing. In addition the outer covering of the cable is usually formed of a woven metallic material so that it may be used as an electrical ground if so desired. The individual conductors in this type of logging cable are disposed in a parallel relationship throughout the length of the cable and are not crossed over or transported in order to reduce the cross-coupling between individual conductors as is often done in transmission cables. It is impossible to cross over or transpose the individual conductors of a cable used in a well logging system since the cable must have the physical strength required to support the downhole tool. If the weight of the downhole tool was suspended on a normal transmission cable the tension stress in the individual conductors would be sufficient to crush the insulation between the transposed conductors, thus resulting in short circuits in a cable. Accordingly, it is the uniform practice in well logging cables to dispose the conductors in a parallel non-transposed relation throughout the length of the cable. A source of signal 20 is shown connected to the conductors 11 and 16 with the conductor 11 being grounded at 21. At the opposite end of the cable the signal is removed from the same conductors 11 and 16. This is the prior art practice for transmitting signals over multi-conductor well logging cables.

Figure 2:
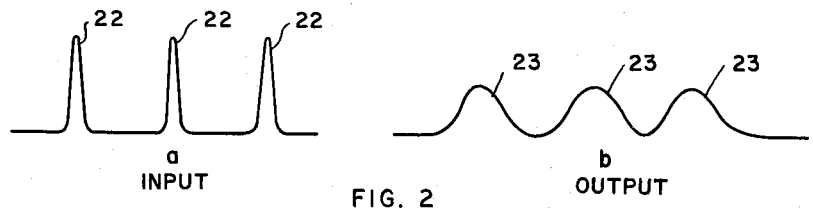
FIGURES 2a and 2b illustrate the distortion that occurs when pulses are transmitted over a cable in accordance with FIGURE 1.

Referring now to FIGURE 2a, the wave form of a series of narrow electrical pulses containing high frequency components 22 is illustrated. If a high frequency signal having this wave form is fed to the sending end of the cable of FIGURE 1 when it arrives at the receiving end of the cable it will have a wave form similar to that shown in FIGURE 2b. As seen in FIGURE 2b the pulses 22 of FIGURE 2a have been distorted and spread out until they have a shape similar to the pulses 23 shown in FIGURE 2b. While it is still possible to distinguish the individual pulses in FIGURE 2b it is substantially impossible to detect with precision the elapsed time between the individual pulses. Furthermore, when the pulses have a high frequency, i.e., a period of less than 100 microseconds, or when the cable is extremely long the pulses will be distorted and spread out to such an extent that it will be substantially impossible to distinguish between the individual pulses.

Figure 3:
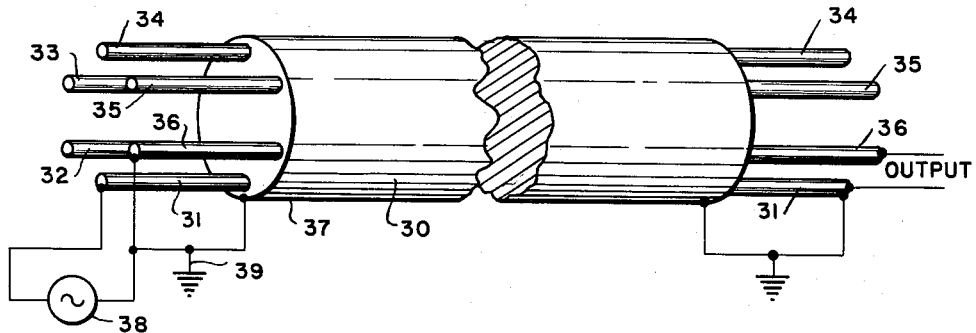
FIGURE 3 illustrates the transmission of electrical pulses over multi-conductor cables in accordance with this invention.

Referring now to FIGURE 3, there is shown an embodiment of this invention which results in substantially distortion-free transmission of the pulses shown in FIGURE 2a. In this embodiment a cable 30 having six conductors 31–36 disposed in a hexagonal spacing is used. In addition, the cable is provided with a metallic outer covering 37. The source of narrow pulses 38 is connected to conductors 31 and the outer covering 37 at the sending end of the cable. In addition, the conductor 36 is electrically shorted to the metallic covering or conductor 37 which is grounded at 39. The pulses are removed from the receiving end of the cable from the conductors 31 and 36 with the conductor 31 at the receiving end of the cable being shorted to the outer covering or conductor 37 and to ground. While the embodiment illustrated in FIGURE 3 utilizes the outer covering 37 as a common conductor on the ground circuit one could also use one of the remaining conductors 32–35 for this purpose. If one of the remaining conductors are used it, of course, decreases the number of transmission circuits available within the cable.

In addition to the arrangement shown in FIGURE 3 the transmission of high frequency electrical pulses can be improved by merely feeding the signals to two conductors at the sending end, for example, conductors 31 and 36, and removing the signals at the receiving end from a different pair of conductors in which one of the conductors is common to both pair, for example conductors 36 and 35 could be used at the receiving end.

In this example, the conductor 36 would be common to both the transmission circuit at the sending end of the cable and the receiving circuit at the receiving end.

Figure 4:
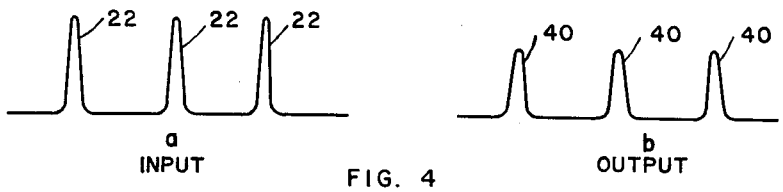
FIGURES 4a and 4b illustrate the lack of distortion in pulses when they are transmitted over a cable in accordance with FIGURE 3.

Referring now to FIGURE 4a, there is shown the wave form of a series of narrow pulses 22. These are the same pulses that were transmitted over the cable of FIGURE 1 and are also transmitted over the cable of FIGURE 3. The wave form shown in FIGURE 4b illustrates a series of pulses 40 which are received at the receiving end of the cable of FIGURE 3 when pulses 22 are fed to the sending end. It will be noted that the wave form of the pulses 40 are only slightly distorted from the wave form of the pulses 22. One can still determine the precise time interval between the individual pulses as well as the original shape of the pulses. Furthermore, the frequency of the pulses can be increased as well as the length of cable and the individual pulses can still be detected.

Referring to FIGURE 5, there is shown an acoustical logging system in which a downhole instrument is lowered in a borehole 60 to determine the acoustical velocity of the formation surrounding the borehole. The downhole instrument utilizes a pulse generator to energize a transmitter 62 to generate a train of acoustical pulses or waves. The acoustical pulses pass through the formation and are received at two receivers 63 and 64 spaced relatively close together. The spacing of the receivers can vary from a few inches to a few feet, but normally is of a short magnitude which results in a time separation between the receipt of the acoustical pulse at the two receivers of less than 100 microseconds. The receivers 63 and 64 are connected to separate switching amplifiers 65 and 66. The switching amplifiers are designed to transmit the initial half cycle of each receiver signal, then add a narrow spike pulse having a larger amplitude and switch off or silence the receiver.

The signal transmitted from the downhole tool is shown in FIGURE 6, in which pulses 73 and 75 illustrate the initial half cycle of the receiver signals while pulses 74 and 76 are the spike pulses added by the switching amplifiers 65 and 66. Thus, the near receiver 63 will not be transmitting over the transmission circuit when the acoustical impulse is received at receiver 64. This eliminates the possibility of the signal from receiver 63 masking out or interfering with the signal from the receiver 64. The various circuits are coupled to the surface instruments by a multi-conductor cable having six conductors 51–56 and a metallic outer covering 57. The individual conductors are shown in a parallel arrangement in FIGURE 5 but are actually disposed in a hexagonal arrangement within a circular cable as shown in FIGURE 7. An amplifier power supply 70 is coupled to the downhole switching amplifiers 65 and 66 by means of conductors 55 and 56. Similarly, a transmitter power supply is coupled to the pulse generator 61 by means of conductor 51 and the outer covering 57. This leaves three conductors 52, 53 and 54 for use as a transmission circuit for the pulses from the switching amplifiers. The switching amplifiers are connected at the lower end of the cable to the conductors 52 and 53 while the signal is removed at the surface from the conductors 53 and 54. The signal at the surface is displayed on an oscilloscope 72. When the signal from the oscilloscope 72 is compared with the original transmitted signal shown in FIGURE 6 it is seen that only a slight distortion occurs.

While the system of FIGURE 5 is described as applying the signal to two conductors at the sending end and removing it from the second pair of conductors at the receiving end with one conductor being common to both the sending and receiving pair the system shown in FIGURE 3 and described above may also be used. In this case, the conductor 54 of FIGURE 5 would be shorted to the conductor 53 which is used as the ground circuit at the sending end. Similarly, at the surface the conductor 52 would be shorted to the conductor 53. The important feature of this invention is that the signal is applied to one pair of conductors at the sending end and removed from a second pair of conductors at the receiving end with one conductor being common to both pairs. In this arrangement the coupling between the conductors of the cable is utilized for transmitting the signal. As explained above, while the actual mechanism of operation of the invention is not completely understood, it is thought to depend on the fact that the attenuation of high frequency signals is greater than the attenuation of low frequency signals while the coupling between individual conductors within the cable is higher for high frequency signals than it is for low frequency signals. Thus, when the system of this invention is used these two mechanisms tend to cancel or equalize each other and the result is substantially distortion free transmission of signals.

Accordingly, while but two embodiments of this invention have been shown and described it should not be limited to the described details since many other selections of conductors within the cable may be utilized without departing from the principle of this invention. It is only necesary to transmit the pulses over one pair of conductors at the sending end and receive them at the receiving end over a second pair of conductors. Preferably, as shown above, one conductor should be common to both pairs and may be grounded or not. Accordingly, the invention should not be limited to the above details but only to its broad spirit and scope.

We claim as our invention:

1. A transmission circuit for transmitting signals from a downhole acoustical logging tool to surface recording instruments, said signals being separated by a time on the order of 100 microseconds, said transmission circuit comprising: a downhole acoustical logging tool, a multi-conductor cable having a plurality of parallel untwisted conductors, said cable being coupled to and in addition supporting said downhole tool for movement through a borehole; a signal producing means in the downhole tool, said signal producing means being coupled to a first pair of conductors in said cable, said first pair of conductors being formed by a first and second conductor; a surface recording instrument said surface recording instrument being coupled to a second pair of conductors in said cable, said second pair of conductors being formed by said second conductor and a third conductor.

2. The transmission circuit of claim 1 wherein the second conductor is shorted to the third conductor at the downhole tool and the second conductor is shorted to the first conductor at the recording instrument.

References Cited by the Examiner
UNITED STATES PATENTS

| | | | |
|---|---|---|---|
| 2,199,221 | 4/1940 | Gilman | 333—84 |
| 2,524,360 | 10/1950 | Russell | 340—18 |
| 2,617,852 | 11/1952 | Waters | 340—18 |
| 3,093,811 | 6/1963 | Schneider. | |
| 3,149,304 | 9/1964 | Summers. | |

BENJAMIN A. BORCHELT, *Primary Examiner.*

IRVING L. SRAGOW, CHESTER L. JUSTUS, SAMUEL FEINBERG, *Examiners.*

N. N. KUNITZ, V. J. DI PIETRO, R. M. SKOLNIK,
*Assistant Examiners.*